United States Patent
Fuju

(10) Patent No.: US 6,707,365 B2
(45) Date of Patent: Mar. 16, 2004

(54) ELECTROMAGNETIC COUPLING APPARATUS

(75) Inventor: Hideaki Fuju, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/283,321

(22) Filed: Oct. 30, 2002

(65) Prior Publication Data

US 2003/0096522 A1 May 22, 2003

(30) Foreign Application Priority Data

Oct. 30, 2001 (JP) .................................... P2001-331964

(51) Int. Cl.⁷ .............................................. H01F 27/30
(52) U.S. Cl. ...................... 336/185; 336/221; 336/205; 439/164
(58) Field of Search ................................ 336/185, 205, 336/221, 208; 439/164, 15

(56) References Cited

U.S. PATENT DOCUMENTS

| | | | | |
|---|---|---|---|---|
| 4,432,446 A | * | 2/1984 | Okano et al. | ......... 192/84.961 |
| 4,470,030 A | * | 9/1984 | Myers | .......... 335/228 |
| 4,503,413 A | | 3/1985 | Stalzer | |
| 4,799,578 A | | 1/1989 | Matsushita | |
| 5,121,093 A | | 6/1992 | Matsushita | |
| 5,392,889 A | | 2/1995 | Koitabashi | |
| 5,812,044 A | | 9/1998 | Sakamoto | |
| 5,889,455 A | | 3/1999 | Sakamoto | |
| 6,053,448 A | | 4/2000 | Sakamoto | |
| 6,069,547 A | | 5/2000 | Sakamoto | |
| 6,091,590 A | | 7/2000 | Sakamoto | |
| 6,272,912 B1 | * | 8/2001 | Sano | ......... 73/118.1 |
| 6,371,270 B1 | | 4/2002 | Matsumoto | |
| 6,471,529 B2 | * | 10/2002 | Oishi | ......... 439/164 |
| 6,504,465 B2 | | 1/2003 | Matsumoto | |
| 6,512,440 B2 | | 1/2003 | Suda | |
| 2001/0017583 A1 | | 8/2001 | Matsumoto | |
| 2002/0050901 A1 | | 5/2002 | Suda | |

FOREIGN PATENT DOCUMENTS

| | | |
|---|---|---|
| EP | 0422962 | 4/1991 |
| EP | 0741254 | 11/1996 |
| EP | 0834888 | 4/1998 |
| JP | 56138529 | 10/1981 |
| JP | 8247171 | 9/1996 |

* cited by examiner

*Primary Examiner*—Anh Mai
(74) *Attorney, Agent, or Firm*—Baker Botts L.L.P.

(57) ABSTRACT

An electromagnetic coupling apparatus includes a ring case, a coil and a connector. The ring case has an annular groove. The coil is an electrical wire and is disposed in the annular groove of the ring case. An opening is formed through the ring case in its closed end surface. The connector is disposed on the closed end surface of the ring case and covers the opening. Each of a first end and a second end of the coil are connected to one of a pair of lead wires, respectively, of an electric circuit via one of a pair of contacts, respectively in the connector. The connector has a housing supporting the first and the second ends of the coil and the contacts and a cap closing an end opening of the housing. The coil is covered substantially by an annular resin case, and the housing is formed integrally with the annular resin case.

23 Claims, 7 Drawing Sheets

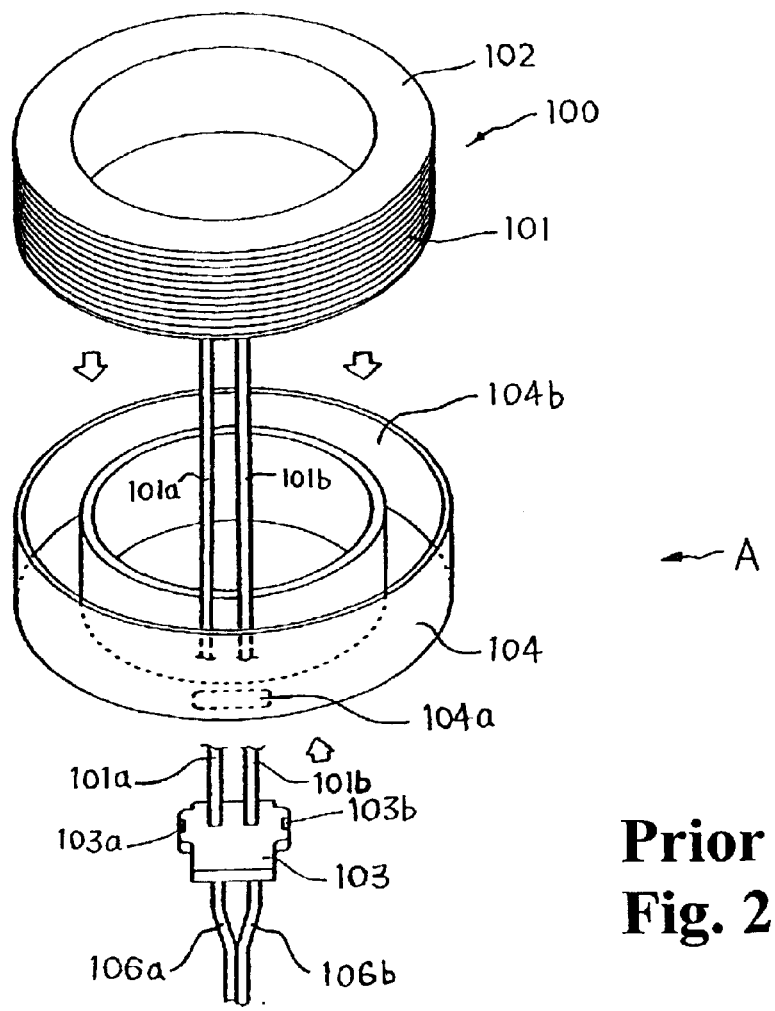
Prior Art Fig. 2
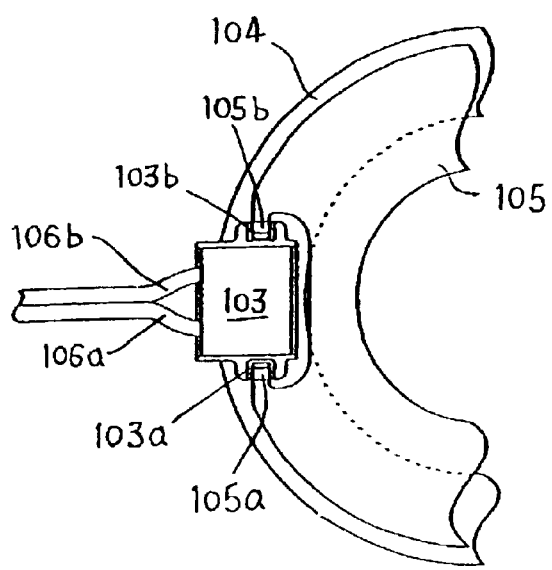
Prior Art Fig. 3

ELECTROMAGNETIC COUPLING APPARATUS

BACKGROUND OF THE INVENTION

1. Field of the Invention

The present invention relates to an electromagnetic coupling apparatus, such as an electromagnetic clutch for use in controlling the transmission of power from an automobile engine to a refrigerant compressor in an automobile air conditioning system. More particularly, it relates to a connection to a connector in the electromagnetic coupling apparatus.

2. Description of Related Art

In FIG. 1, a known compressor 110 of an automobile air conditioning system is shown. Compressor 110 may include an electromagnetic clutch 109. Electromagnetic clutch 109 may selectively connect and disconnect a drive source to a drive shaft of compressor 110.

Electromagnetic clutch 109 may include an electromagnetic coupling apparatus A. An electromagnetic coupling apparatus A comprises an annular ring case 104, a coil assembly 100, and a connector 103 (shown in FIGS. 2 and 3). Coil assembly 100 is disposed in an annular groove 104b of ring case 104. A bottom portion of ring case 104 is fixed to a housing of compressor 110, via a plate 105.

As shown in FIG. 2, coil assembly 100 includes a coil bobbin 102 and a coil 101 wound around coil bobbin 102. Coil 101 comprises of an electrical wire. Coil 101 has end portions 101a, 110b. An opening 104a is formed through a bottom portion of ring case 104. Coil assembly 100 may be positioned within annular groove 104b of ring case 104, so that end portions 101a, 101b of coil 101 pass through opening 104a. After passing through opening 104a, end portions 101a, 101b of coil 101 may be secured in connector 103. Within connector 103, each of end portions 101a, 101b of coil 101 may be connected electrically with a respective one of a pair of external wires 106a, 106b. Connector 103 may be secured to ring case 104, so that a portion of connector 103 fits into opening 104a of ring case 104.

With reference to FIG. 3, connector 103 includes a hook receiving portions 103a, 103b. By grasping looks 105a, 105b of plate 105 into hook receiving portions 103a, 103b of connector 103, connector 103 may be fixed to the bottom portion of ring case 104.

In the known electromagnetic coupling apparatus A, the plurality of hooks 105a, 105b must engage the plurality of hook receiving portions 103a, 103b by hand. Therefore, the manufacturing efficiency connecting connector 103 to ring case 104 is reduced. If hooks 105a, 105b are engaged to hook portions 103a, 103b, the grasping tool may damage connector 103. Further, in the known electromagnetic coupling apparatus A, the plurality of hooks 105a, 105b are formed in the plate 105, which increases the size of plate 105.

SUMMARY OF THE INVENTION

Therefore, a need has arisen for electromagnetic coupling apparatus for use in an electromagnetic clutch that overcome these and other shortcomings of the related art. A technical advantage of the present invention is that grasping portions are not required to connect a connector to a ring case.

In an embodiment of this invention, an electromagnetic coupling apparatus comprises a ring case, a coil and a connector. The ring case comprises an annular groove, which has an open edge. The coil comprises an electrical wire and is disposed in the annular groove of the ring case. An opening is formed through the ring case in its closed end surface. The connector is disposed on the closed end surface of the ring case and covers the opening. Each of a first end and a second end of the coil are connected to one of a pair of lead wires, respectively, of an electric circuit via one of a pair of contacts, respectively in the connector. The connector comprises a housing and a cap. The housing supports the first and the second ends of the coil and the pair of contacts in its interior. The cap closes an end opening of the housing. The coil is covered substantially by an annular resin case. The housing is formed integrally with the annular resin case.

In another embodiment of this invention, an electromagnetic coupling apparatus comprises a ring case, a coil and a connector. The ring case comprises an annular groove, which has an open edge. The coil comprises an electrical wire and is disposed in the annular groove of the ring case. An opening is formed through the ring case in its closed end surface. The connector is disposed on the closed end surface of the ring case and covers the opening. Each of a first end and a second end of the coil are connected to one of a pair of lead wires, respectively, of an electric circuit via one of a pair of contacts, respectively in the connector. The connector comprises a housing and a cap. The housing supports the first and the second ends of the coil and the pair of contacts in its interior. The cap closes an end opening of the housing. A resin annularly encases the entire the coil. The housing is formed integrally with the annular resin mold.

In still another embodiment of this invention, an electromagnetic coupling apparatus comprises a ring case, a coil and a connector. The ring case comprises an annular groove, which has an open edge. The coil comprises an electrical wire and is disposed in the annular groove of the ring case. An opening is formed through the ring case in its closed end surface. The connector is disposed on the closed end surface of the ring case and covers the opening. Each of a first end and a second end of the coil are connected to one of a pair of lead wires, respectively, of an electric circuit via one of a pair of contacts, respectively in the connector. The connector comprises a housing and a cap. The housing supports the first and the second ends of the coil and the pair of contacts in its interior. The cap closes an end opening of the housing. The coil is covered substantially by an annular resin case. The housing is glued on an end surface of the annular resin case that is disposed to correspond to the opening of the ring case.

In yet another embodiment of this invention, an electromagnetic coupling apparatus comprises a ring case, a coil and a connector. The ring case comprises an annular groove, which has an open edge. The coil comprises an electrical wire and is disposed in the annular groove of the ring case. An opening is formed through the ring case in its closed end surface. The connector is disposed on the closed end surface of the ring case and covers the opening. Each of a first end and a second end of the coil are connected to one of a pair of lead wires, respectively, of an electric circuit via one of a pair of contacts, respectively in the connector. The connector comprises a housing and a cap. The housing supports the first and the second ends of the coil and the pair of contacts in its interior. The cap closes an end opening of the housing. A resin annularly encases the entire the coil. The housing is glued on an end surface of the annular resin case that is disposed to correspond to the opening of the ring case.

In a further embodiment, the invention comprises a method for assembling an electromagnetic coupling apparatus. The method comprises the steps of: encasing a coil covered substantially by an annular resin encasement, e.g., an annular resin case or an annular resin mold, in a ring case, and positioning a housing of a connector, which is formed integrally with the annular resin encasement, in an opening of the ring case. This method further comprises the steps of connecting a plurality of contacts with a pair of lead wires and with a plurality of support portions of the housing; and closing an end opening of the housing by a cap of the connector. In this method, the encasing step and the positioning step may be performed simultaneously.

Other objects, features, and advantages of embodiments of this invention will be apparent to, and understood by, persons of ordinary skill in the art from the following description of preferred embodiments with reference to the accompanying drawings.

BRIEF DESCRIPTION OF THE DRAWINGS

Embodiments of the invention are described now with reference to the accompanying figures, which are given by way of example only, and are not intended to limit the present invention.

FIG. 2 is an exploded and perspective view of a known electromagnetic coupling apparatus.

FIG. 3 is a partial bottom of the electromagnetic coupling apparatus of FIG. 2.

DETAILED DESCRIPTION OF PREFERRED EMBODIMENTS

Figure 1:
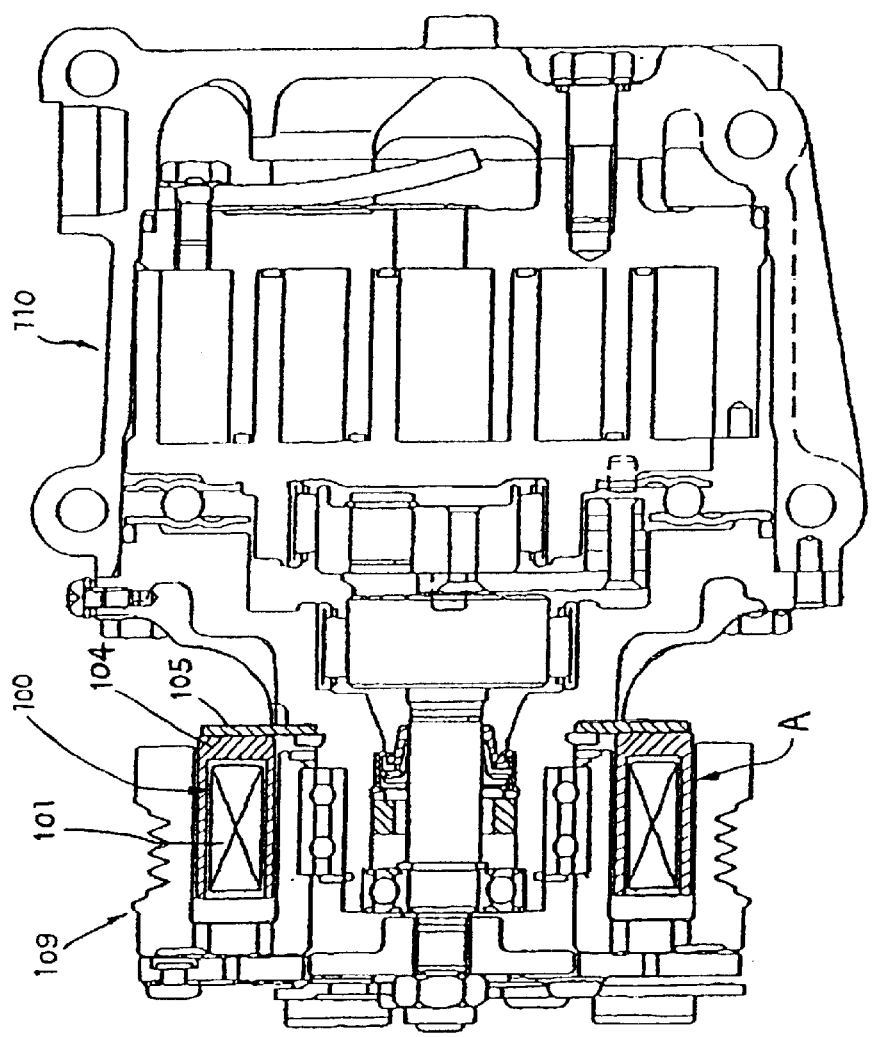
FIG. 1 is a longitudinal cross-sectional view of a known compressor that includes an electromagnetic clutch having an electromagnetic coupling apparatus.
Figure 4:
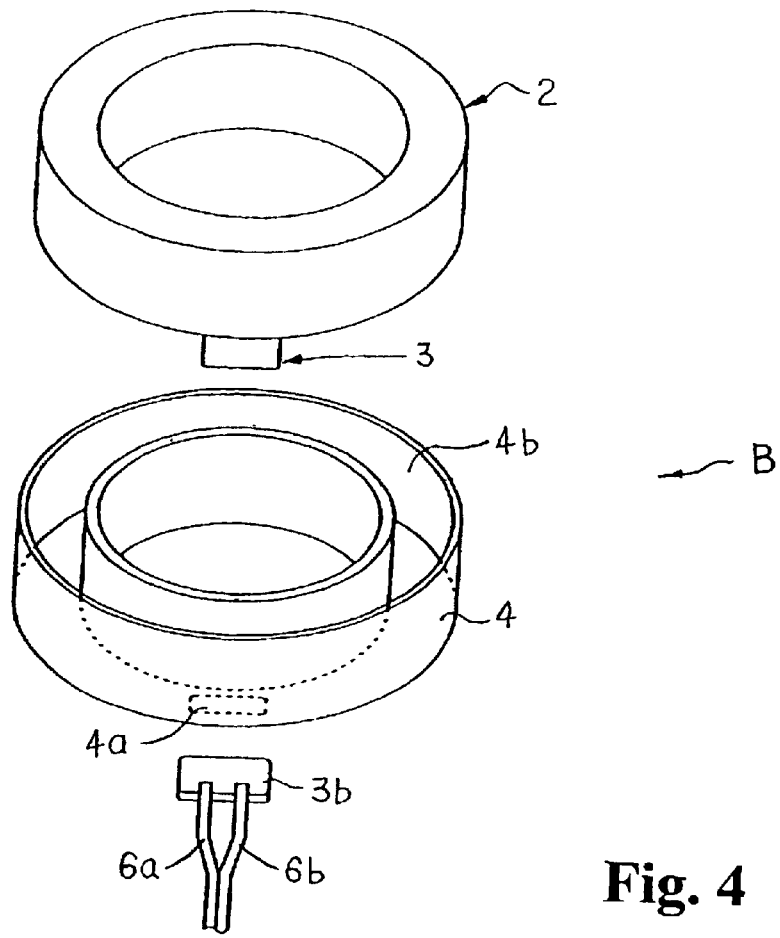
FIG. 4 is an exploded and perspective view of an electromagnetic coupling apparatus, according to a first embodiment of the present invention.

Referring to FIGS. 4–7, a first embodiment of the present invention of an electromagnetic coupling apparatus for use in an electromagnetic clutch is shown. Electromagnetic coupling apparatus B includes a coil 1 comprising an electrical wire. Coil 1 is covered substantially by an annular resin case 2. Annular resin case 2 has a pair of ring parts 2a, 2b, each having an annular groove (not shown). Annular resin case 2 may be formed by gluing the end openings of the annular grooves of ring parts 2a, 2b to each other.

A connector 3 comprises a housing 3a and a cap 3b. Housing 3a has a box shape including a bottom. Housing 3a is formed integrally with a closed end surface of ring part 2a of annular resin case 2. First and second ends (not shown) of coil 1 are received and secured by support portions (not shown) in housing 3a.

A ring case 4 comprises an annular groove 4b formed at an open edge, and an opening 4a formed through ring case 4 in a closed end surface opposite the open edge of ring case 4. Coil 1, which is covered substantially by an annular resin case 2, is disposed in annular groove 4b of ring case 4 and is fixed in ring case 4 by sealing the open edge of annular groove 4b. Housing 3a is inserted in opening 4a. A portion of housing 3a projects from ring case 4. Housing 3a covers opening 4a. A plate 5 is disposed on the closed end surface of ring case 4.

A pair of lead wires 6a, 6b of an electric circuit (not shown) are connected to the first and the second ends of coil 1, respectively, via a pair of contacts 7a, 7b, in connector 3. Contacts 7a, 7b are connected to a diode 8. The ends of lead wires 6a, 6b and diode 8 are supported via contacts 7a, 7b, respectively, in housing 3a. Cap 3b closes an end opening of housing 3a and is fixed in housing 3a, for example, by gluing.

Figure 7:
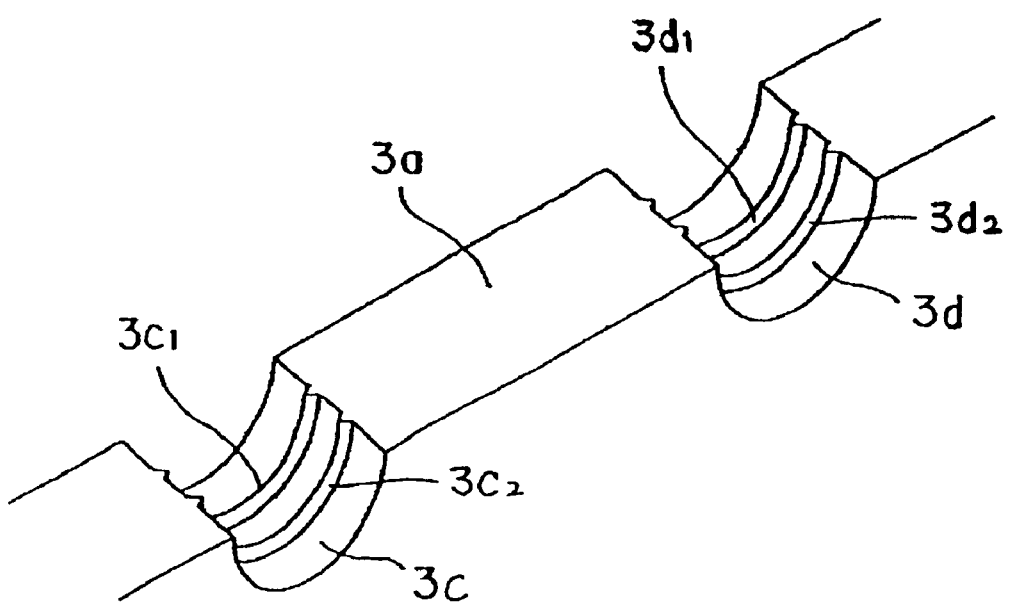
FIG. 7 is a partial enlarged and perspective view of a housing of connector of FIG. 6.

Housing 3a comprises arc-shaped hollow portions 3c, 3d formed at an open edge of housing 3a. Further, cap 3b comprises arc-shaped hollow portions 3e, 3f formed at an end surface of said cap 3b. Arc-shaped hollow portions 3c, 3d face to arc-shaped hollow portions 3e, 3f, respectively, and these pairs of arc-shaped hollow portions secure lead wires 6a, 6b between them, respectively. Each of the curvature radii of arc-shaped hollow portions 3c, 3d and 3e, 3f arc less than the curvature radii of lead wires 6a, 6b, respectively. As shown in FIG. 7, each of arc-shaped hollow portions 3c, 3d comprise a plurality of ribs 3c1, 3c2 and 3d1, 3d2, respectively, which generally extend in the circumference direction on their inside surface. Moreover, each of arc-shaped hollow portions 3e, 3f have a plurality of ribs (not shown), respectively, which generally extend in the circumference direction on their inside surface.

With respect to, the first embodiment of the present invention of an electromagnetic coupling apparatus B, cross-sections of ribs 3c1, 3c2 and 3d1, 3d2 are substantially triangular, nevertheless, the cross-sections of these ribs may be square, arc-shaped, saw toothed, or the like.

The first embodiment of the present invention of the electromagnetic coupling apparatus B may be assembled as described below. First, coil 1, which is covered substantially by annular resin case 2, may be encased to ring case 4. At the same time, housing 3a, which is formed integrally with annular resin case 2, may be inserted into opening 4a. Second, contacts 7a, 7b, which are connected with the ends of lead wires 6a, 6b, respectively, may be connected to the support portions of housing 3a. Third, the end opening of housing 3a may be closed by cap 3b of connector 3. Electromagnetic coupling apparatus B then may be connected to a refrigerant compressor used for an air conditioning system for vehicle (not shown) via plate 5.

Figure 5:
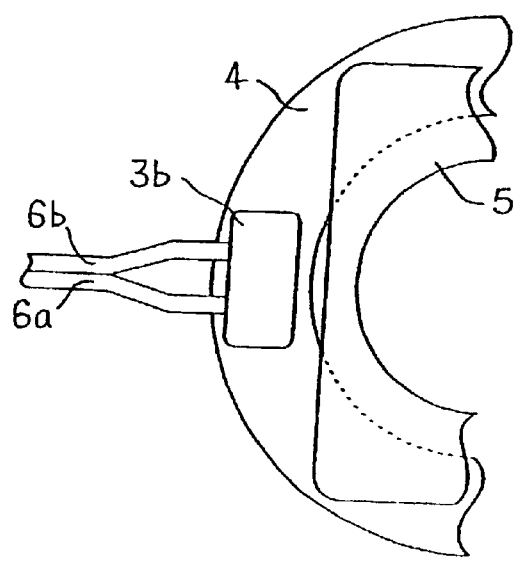
FIG. 5 is a partial bottom of the electromagnetic coupling apparatus of FIG. 4.
Figure 6:
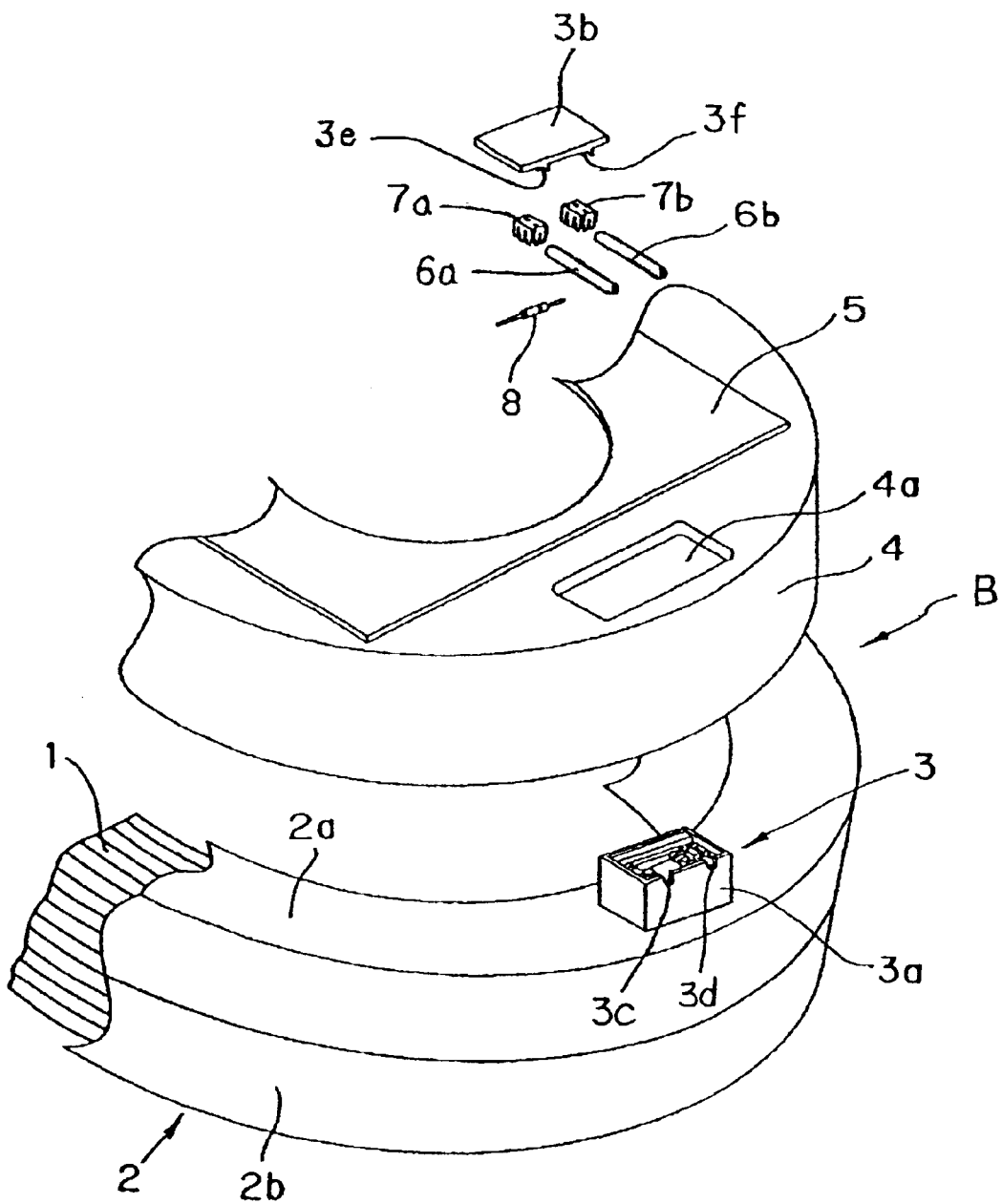
FIG. 6 is an exploded and perspective view of an electromagnetic coupling apparatus that includes a connector, according to a first embodiment of the present invention.

In the first embodiment of the present invention of electromagnetic coupling apparatus B, housing 3a of connector 3 may be formed integrally with ring part 2a of annular resin case 2. Therefore, connector 3 need not be sealed to engage it to ring case 4. As a result, the manufacturing efficiency in connecting connector 3 to ring case 4 is improved. When hooks are engaged to hook portions the sealing tool does not damage connector 3. Further, a hook need not be formed on the plate 5. Consequently, as shown in FIG. 5, a size of plate 5 may be less than a size of known plates.

Moreover, each of the curvature radii of arc-shaped hollow portions 3c, 3d and 3e, 3f are less than curvature radii of lead wires 6a, 6b, respectively. Therefore, lead wires 6a, 6b may be secured tightly within connector 3, and connector 3 may be sealed tightly.

Moreover, ribs 3c1, 3c2 and 3d1, 3d2 are formed on the inside surface of arc-shaped hollow portions 3c, 3d and generally extend in a circumferencial direction. Moreover, a plurality of ribs (not shown) are formed on the inside surface of arc-shaped hollow portions 3e, 3f and generally extend in a circumferencial direction. Therefore, ribs 3c1, 3c2, 3d1, 3d2 and others may bite into coverings of lead wires 6a, 6b. Thus, lead wires 6a, 6b may be fixed tightly within connector 3, and connector 3 may be sealed tightly.

Figure 8:
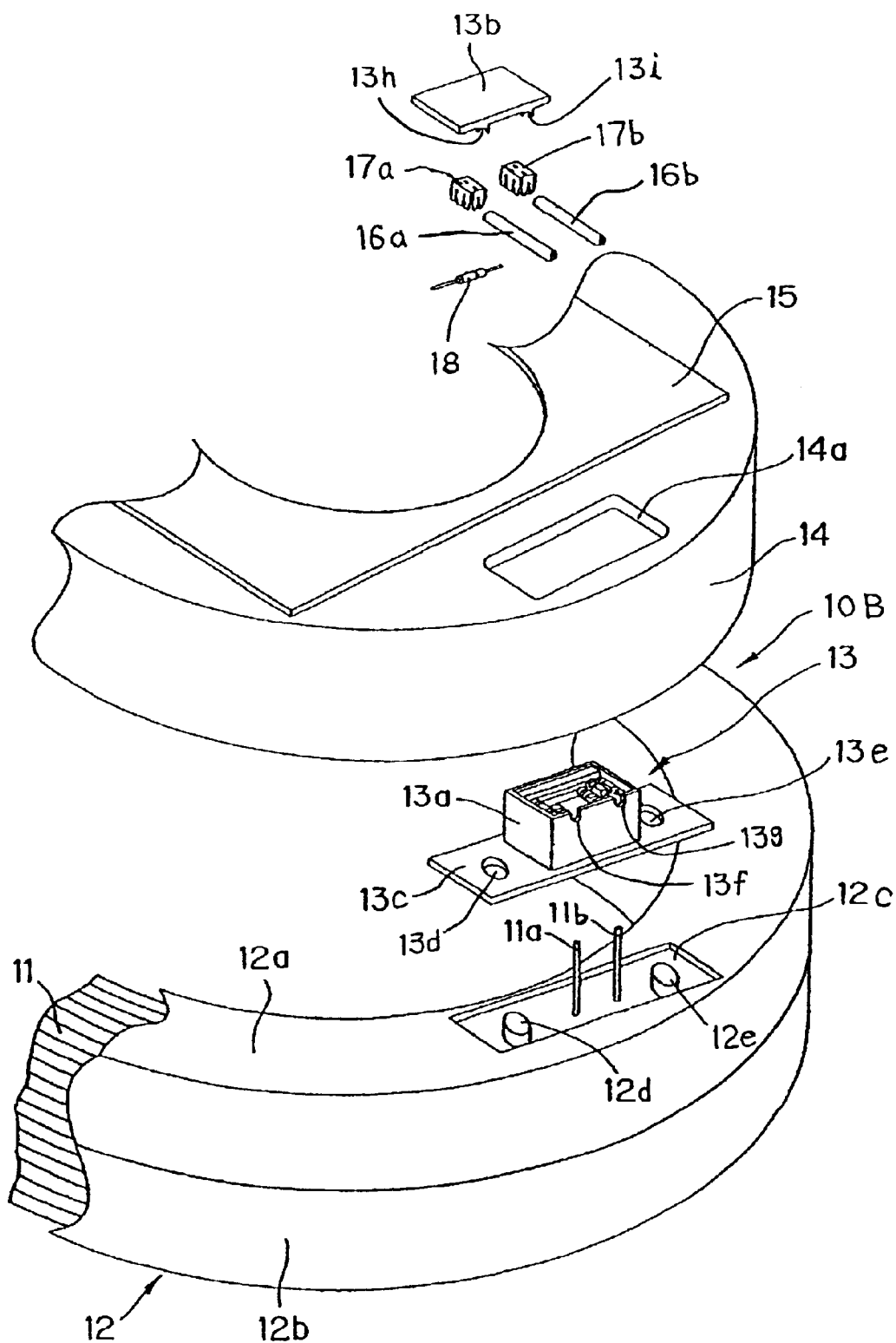
FIG. 8 is an exploded and perspective view of an electromagnetic coupling apparatus that includes a connector, according to a second embodiment of the present invention.

Referring to FIG. 8, a second embodiment of the present invention of an electromagnetic coupling apparatus for use in an electromagnetic clutch is shown. The electromagnetic coupling apparatus 10B includes a coil 11 comprising an electrical wire. Coil 11 is covered substantially by an annular resin case 12. Annular resin case 12 has a pair of ring parts 12a, 12b each having an annular groove (not shown). Annular resin case 12 may be formed by gluing the end openings of the annular grooves of ring parts 12a, 12b to each other. Ring part 12a comprises a hollow portion 12c formed in a closed end surface of ring part 12a. Ring part 12a also comprises a pair of columns 12d, 12e standing adjacent to each other in hollow portion 12c. A first end 11a and a second end 11b of coil 11 are projecting from annular resin case 12 through hollow portion 12c.

A connector 13 comprises a housing 13a and a cap 13b. Housing 13a has a box shape including a bottom. Housing 13a comprises a base 13c, formed integrally and extending beyond opposing sides of the bottom of housing 13a. Base 13c includes a pair of openings 13d, 13e formed in base 13c on either side of connector 13. Columns 12d, 12e are adapted to be received by openings 13d, 13e, and base 13c is adapted to be received by hollow portion 12c. Thus, housing 13a is fixed to a closed end surface of ring part 12a, for example, by gluing. First and second ends 11a, 11b of coil 11 are received and secured by support portions (not shown) in housing 13a.

A ring case 14 comprises an annular groove (not shown) formed at an open edge, and an opening 14a is formed through ring case 14 in a closed end surface opposite the open edge of ring case 14. Coil 11, which is covered substantially by annular resin case 12, is disposed in the annular groove of ring case 14 and is fixed in ring case 14 by sealing the open edge of the annular groove. Housing 13a is inserted in opening 14a. A portion of housing 13a projects from ring case 14. Housing 13a covers opening 14a. A plate 15 is disposed on the closed end surface of ring case 14.

A pair of lead wires 16a, 16b of an electric circuit (not shown) are connected to the first and the second ends 11a, 11b of coil 11, respectively, via a pair of contacts 17a, 17b in connector 13. Contacts 17a, 17b are connected to a diode 18. The ends of lead wires 16a, 16b and diode 18 are supported via contacts 17a, 17b, respectively, in housing 13a. Cap 13b closes an end opening of housing 13a and is fixed to housing 13a for example, by gluing.

Housing 13a comprises arc-shaped hollow portions 13f, 13g formed at an open edge of housing 13a. Further, cap 13b comprises arc-shaped hollow portions 13h, 13i formed at an end surface of said cap 13b. Arc-shaped hollow portions 13f, 13g face to arc-shaped hollow portions 13h, 13i, respectively, and these pair of arc-shaped hollow portions secure lead wires 16a, 16b between them, respectively. Each of the curvature radii of arc-shaped hollow portions 13f, 13g and 13h, 13i is less than the curvature radii of lead wires 16a, 16b, respectively. Moreover, each of arc-shaped hollow portions 13f, 13g and 13h, 13i comprises a plurality of ribs (not shown) which correspond to ribs 3c1, 3c2 and 3d1, 3d2, as described with respect to the first embodiment of electromagnetic coupling apparatus B.

The second embodiment of the present invention of the electromagnetic coupling apparatus 10B may be assembled as described below. First, housing 13a of connector 13 may be glued on the end surface of annular resin case 12. Connector 13 may be positioned to correspond to opening 14a of a ring case 14, wherein annular resin case 12 substantially covers coil 11. Second, coil 11, which is covered substantially by annular resin case 12, may be encased in ring case 14. At the same time, housing 13a, which is formed integrally with annular resin case 12, may be inserted into opening 14a of ring case 14. Third, contacts 17a, 17b, which are connected with the ends of lead wires 16a, 16b, may be connected to support portions of housing 13a. Fourth, the end opening of housing 13a may be closed by cap 13b of connector 13. Electromagnetic coupling apparatus 10B then may be connected to a refrigerant compressor used for an air conditioning system for vehicle (not shown) via plate 15.

Referring again to the second embodiment of the present invention of the electromagnetic coupling apparatus 10B, housing 13a of connector 13 may be glued on the closed end surface of ring part 12a of annular resin case 12, prior to the other assembly steps. Therefore, connector 13 may engage ring case 14 without the necessity of sealing ring case 14. As a result, the manufacturing efficiency of connecting connector 13 to ring case 14 is improved. When hooks are engaged to hook portions, the sealing tool does not damage connector 13. Further, a hook need not be formed on the plate 15. Consequently, as shown in FIG. 8, a size of plate 15 may be less than a size of a known plate.

Moreover, housing 13a of connector 13 comprises base 13c including openings 13d, 13e formed in base 13c of the housing 13a. Ring part 12a has hollow portion 12c including columns 12d, 12e on the closed end surface of ring part 12a. Base 13c is received by hollow portion 12c, and columns 12d, 12e are inserted into openings 13d, 13e, respectively. Therefore, housing 13a may be fixed to the closed end surface of ring part 12a, rapidly and exactly.

Moreover, each of the curvature radii of arc-shaped hollow portions 13f, 13g and 13h, 13i are less than curvature radii of lead wires 16a, 16b. Therefore, lead wires 16a, 16b may be secured tightly within connector 3, and connector 3 may be sealed tightly.

Moreover, ribs (not shown) are formed on the inside surface of arc-shaped hollow portions 13f, 13g, 13h, 13i and generally extend in a circumferencial direction. Therefore, ribs may bite into coverings of lead wires 16a, 16b. Thus, lead wires 16a, 16b may be fixed tightly within connector 3, and connector 3 may be sealed tightly.

Referring yet again to the second embodiment, the ends of columns 12d, 12e may be narrow and may approach points. Thus, columns 12d, 12e may be more readily received by openings 13d, 13e of base 13c.

Figure 9:
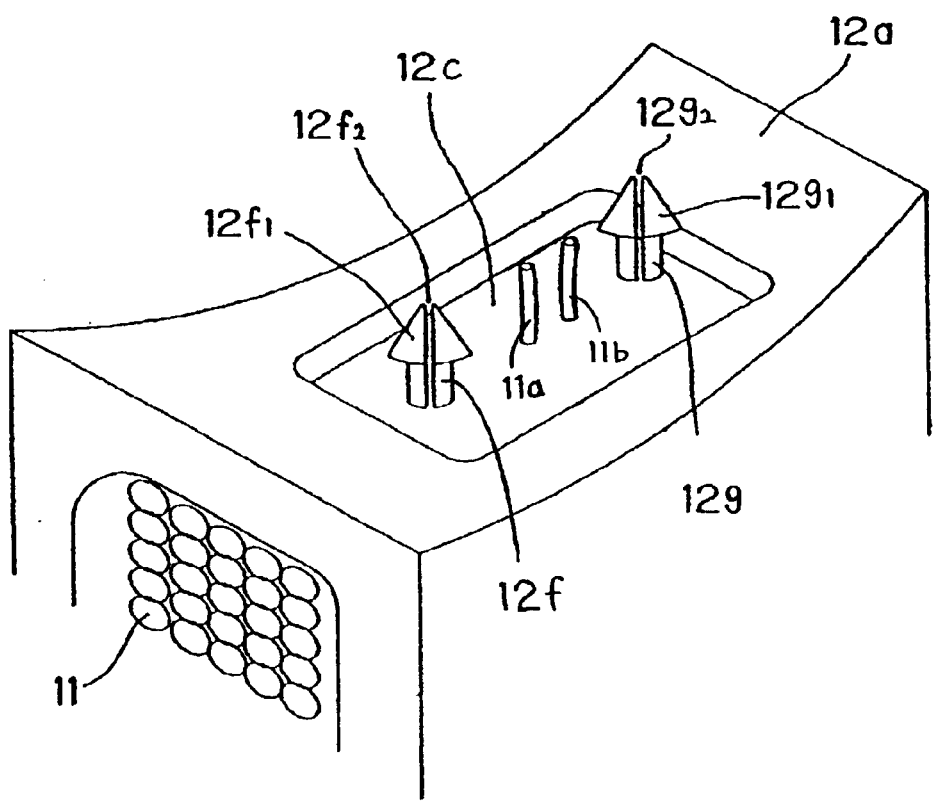
FIG. 9 is a partial enlarged and perspective view of an annular resin case of an electromagnetic coupling apparatus, according to an another embodiment of the present invention.

Referring to FIG. 9, a modification of the second embodiment of the present invention of an electromagnetic coupling apparatus 10B is shown. Ring part 12a covers coil 11. Ring part 12a comprises a hollow portion 12c formed through a closed end surface of ring part 12a, and ring part 12a also comprises a pair of projections 12f, 12g standing adjacent to each other in hollow portion 12c. First and second ends 11a, 11b of coil 11 project from hollow portion 12c. Projections 12f, 12g have respectively hook portions 12f1, 12g1 at a point of projections 12f, 12g. Hook portions 12f1, 12g1 are narrow as they approach the points of projections 12f, 12g.

Projections 12*f*, 12*g* further comprise slits 12*f*2, 12*g*2, respectively, and extend axially. Projections 12*f*, 12*g* are received by the openings 13*d*, 13*e*, respectively, as shown the second embodiment of electromagnetic coupling apparatus 10B, and hook portions 12*f*1, 12*g*1 engage an edge of openings 13*d*, 13*e*, respectively.

Therefore, housing 13*a* may be fixed to the closed end surface of ring part 12*a*, securely and precisely. Housing 13*a* may maintain a tight contact against ring part 12*a* until the gluing of housing 13*a* to ring part 12*a* is complete.

Moreover, hook portions 12*f*1, 12*g*1 are narrow as they approach the points of projections 12*f*, 12*g*, respectively, and projections 12*f*, 12*g* comprise slits 12*f*2, 12*g*2, respectively, which extend axially. Therefore, projections 12*f*, 12*g* may be subject to reduced stresses at the circumference of openings 13*d*, 13*e*, respectively, because projections 12*f*, 12*g* elastically disfigure toward axes of projections 12*f*, 12*g*, respectively, when projections 12*f*, 12*g* are inserted into openings 13*d*, 13*e*.

With respect to the first and the second embodiments of the present invention of an electromagnetic coupling apparatus B and 10B, instead of coils 1, 11 covered substantially by annular resin case 2, 12, housing 3*a*, 13*a* may be formed integrally with resin cases 2, 12 or may be molded substantially from a resin. Similarly, a housing may be formed integrally with the annular resin mold, or also may be glued on an end surface of with the annular resin mold that is positioned to correspond to an opening of a ring case.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims, which follow.

What is claimed is:

1. An electromagnetic coupling apparatus comprising:
    a ring case comprising an annular groove, which has an open edge;
    an annular resin case having an annular groove, wherein said annular resin case is disposed in said annular groove of said ring case;
    a coil comprising an electrical wire, wherein said coil is covered substantially by said annular resin case;
    an opening formed through said ring case in a closed end surface of said ring case;
    a connector disposed on said closed end surface of said ring case, such that said connector covers said opening, and said connector comprising a housing and a cap, wherein said connector supports a first and a second ends of said coil and a pair of contacts, and said cap closes an end opening of said housing, and wherein said housing is formed integrally with said annular resin case; and
    each of a first end lead wire and a second end lead wire of an electric circuit are connected to one of said first and said second ends, respectively, via one of said pair of contacts, respectively, in said connector.

2. The electromagnetic coupling apparatus of claim 1, wherein said annular resin case comprising a pair of ring parts each having an annular groove, and said annular resin case is formed by joining the end openings of said annular grooves of said ring parts to each other.

3. The electromagnetic coupling apparatus of claim 1, wherein said housing comprises an arc-shaped hollow portion formed at an open edge of said housing, and said cap comprises an arc-shaped hollow portion formed at an end surface of said cap, and said arc-shaped hollow portions face each other, so that said lead wires are secured therebetween.

4. The electromagnetic coupling apparatus of claim 3, wherein at least one rib is formed on an inside surface of at least one of said arc-shaped hollow portions, said at least one rib extending in a substantially circumferencial direction.

5. The electromagnetic coupling apparatus of claim 4, wherein curvature radii of said arc-shaped hollow portions are less than curvature radii of said lead wires.

6. An electromagnetic coupling apparatus comprising:
    a ring case comprising an annular groove, which has an open edge;
    a coil comprising an electrical wire, wherein said coil is disposed in said annular groove of said ring case, and said coil is molded annularly within a resin;
    an opening formed through said ring case in a closed end surface of said ring case;
    a connector disposed on said closed end surface of said ring case, such that said connector covers said opening, and said connector comprising a housing and a cap, wherein said housing supports a first and a second ends of said coil and a pair of contacts, and said cap closes an end opening of said housing, and wherein said housing is formed integrally with an annular resin mold; and
    each of a first end lead wire and a second end lead wire of an electric circuit are connected to one of said first and said second ends, respectively, via one of said pair of contacts, respectively, in said connector.

7. An electromagnetic coupling apparatus comprising:
    a ring case comprising an annular groove, which has an open edge;
    an annular resin case having an annular groove, wherein said annular resin case is disposed in said annular groove of said ring case;
    a coil comprising an electrical wire, wherein said coil is covered substantially by said annular resin case;
    an opening formed through said ring case in a closed end surface of said ring case;
    a connector disposed on said closed end surface of said ring case, such that said connector covers said opening, and said connector comprising a housing and a cap, wherein said housing supports a first and a second ends of said coil and a pair of contacts, and said cap closes an end opening of said housing, and wherein said housing is glued on an end surface of said annular resin case, and said housing is positioned to correspond to said opening of said ring case; and
    each of a first end lead wire and a second end lead wire of an electric circuit are connected to one of said first and said second ends, respectively, via one of said pair of contacts, respectively, in said connector.

8. The electromagnetic coupling apparatus of claim 7, wherein said annular resin case comprising a pair of ring parts each having an annular groove, and said annular resin case is formed by joining the end openings of said annular grooves of said ring parts to each other.

9. The electromagnetic coupling apparatus of claim 7, wherein said annular resin case comprises a hollow portion adapting to receive said housing of said connector on an end surface of said annular resin case, such that said housing is positioned to correspond to said opening of said ring case.

10. The electromagnetic coupling apparatus of claim 9, wherein said connector comprises a base formed and extending beyond opposing sides of a bottom of said housing, and said connector positioned in said hollow portion with said base.

11. The electromagnetic coupling apparatus of claim 7, wherein said annular resin case comprises a projection disposed in an opening formed in said housing of said connector.

12. The electromagnetic coupling apparatus of claim 11, wherein said projection is narrowed so as to form a point.

13. The electromagnetic coupling apparatus of claim 11, wherein said projection comprises a hook portion to engage an edge of said opening of said housing.

14. The electromagnetic coupling apparatus of claim 11, wherein said projection comprises a slit extending axially.

15. The electromagnetic coupling apparatus of claim 7, wherein said annular resin case comprises a hollow portion formed therein and including a projection in its inside, and said connector comprising a base formed and extending beyond opposing sides of said housing, and said base is adapted to be received by said hollow portion of said annular resin case and also said projection is adapted to be received by an opening formed in said base.

16. The electromagnetic coupling apparatus of claim 7, wherein said housing comprises an arc-shaped hollow portion formed at an open edge of said housing, and said cap comprises an arc-shaped hollow portion formed at an end surface of said cap, and said arc-shaped hollow portions face each other, so that said lead wires are secured therebetween.

17. The electromagnetic coupling apparatus of claim 7, wherein at least one rib is formed on an inside surface of at least one of said arc-shaped hollow portions, said at least one rib extending in a substantially circumferencial direction.

18. The electromagnetic coupling apparatus of claim 17, wherein curvature radii of said arc-shaped hollow portions are less than curvature radii of said lead wires.

19. An electromagnetic coupling apparatus comprising:

a ring case comprising an annular groove, which has an open edge;

a coil comprising an electrical wire, wherein said coil is disposed in said annular groove of said ring case, and coil is molded annularly within a resin;

an opening formed through said ring case in a closed end surface of said ring case;

a connector disposed on said closed end surface of said ring case, such that said connector covers said opening, and said connector comprising a housing and a cap, wherein said housing supports a first and a second ends of said coil and a pair of contacts, and said cap closes an end opening of said housing, and wherein said housing is glued on an end surface of said coil molded within said resin that is positioned to correspond to said opening of said ring case; and each of a first end lead wire and a second end lead wire of an electric circuit are connected to one of said first and said second ends, respectively, via one of said pair of contacts, respectively, in said connector.

20. A method for assembling an electromagnetic coupling apparatus, comprising the steps of:

encasing a coil covered substantially by an annular resin encasement in a ring case;

positioning a housing of a connector, which is formed integrally with said annular resin encasement, in an opening of said ring case;

connecting a plurality of contacts with a pair of lead wires and with a plurality of support portions of said housing; and closing an end opening of said housing by a cap of said connector.

21. The method of claim 20, wherein said annular resin encasement is selected from the group consisting of an annular resin case and an annular resin mold.

22. The method of claim 20, wherein said encasing step and said positioning step are performed simultaneously.

23. The method of claim 20, further comprising the step of;

gluing a housing of a connector on an end surface of an annular resin case before the encasing.

* * * * *